United States Patent [19]
Wagner

[11] Patent Number: 5,940,868
[45] Date of Patent: Aug. 17, 1999

[54] LARGE MEMORY ALLOCATION METHOD AND APPARATUS

[75] Inventor: Dave Wagner, Issaquah, Wash.

[73] Assignee: Digital Equipment Corporation, Houston, Tex.

[21] Appl. No.: 08/896,393

[22] Filed: Jul. 18, 1997

[51] Int. Cl.⁶ ..................................................... G06F 12/02
[52] U.S. Cl. .......................... 711/203; 711/209; 711/220
[58] Field of Search ............................... 711/202, 2, 171, 711/173, 203, 209, 220

[56] References Cited

U.S. PATENT DOCUMENTS

| | | | |
|---|---|---|---|
| 4,300,192 | 11/1981 | Couleur | 711/153 |
| 5,381,537 | 1/1995 | Baum | 711/206 |
| 5,423,013 | 6/1995 | Baum | 711/163 |
| 5,577,231 | 11/1996 | Scalzi | 395/500 |
| 5,708,790 | 1/1998 | White | 711/203 |
| 5,860,141 | 1/1999 | Washington | 711/202 |
| 5,860,144 | 1/1999 | Frank | 711/206 |

FOREIGN PATENT DOCUMENTS 0208429  1/1987  European Pat. Off. .

OTHER PUBLICATIONS

Inside Windows NT, Custer H., ISBN1–55615–481–X, pp. 83–90, 1993.
"Two–Level Access List" *IBM Technical Disclosure Bulletin*, 34:10A, Mar. 1992.
"Oracle Very Large Memory (VLM) for Digital Alpha NT," http://ntsolutions.oracle.com/index.htm, pp. 1–12 (Aug. 1997).

*Primary Examiner*—John W. Cabeca
*Assistant Examiner*—Christopher S. Chow
*Attorney, Agent, or Firm*—Hamilton, Brook, Smith & Reynolds, P.C.

[57] ABSTRACT

Computer method and apparatus for allocating and accessing large memory. Under a given operating system, the invention apparatus creates multiple processes, each having a corresponding virtual memory space allocated to the process. The generated virtual memory spaces allocated for the created processes are aggregated together to form a single working memory area. An index member cross references the formed working memory area relative to the created processes. As a result, the index member enables access to the generated virtual memory spaces collectively as though they were a single large working memory area.

20 Claims, 3 Drawing Sheets

LARGE MEMORY ALLOCATION METHOD AND APPARATUS

BACKGROUND

Generally speaking, in a computer system the operating system allocates memory in response to various driver or system (kernel code) and application (user code) requests. Depending on the operating system, memory allocation may be limited to mapped (vs. unmapped) pages of physical memory. For example, a UNIX system allows unmapped pages to be allocated from kernel code. On the other hand, the Windows NT system provides no interface to allocate unmapped physical pages and requires allocated pages to be mapped into a virtual address space.

Therefore, the size of memory being allocated is limited by the size of the virtual memory address space of the operating system. That is, in an operating system that employs n-bit virtual memory addressing, the largest virtual memory space allowed/enabled is $2^n$ bytes of virtual memory. For example, in Windows NT memory allocation is limited by the 32-bit (4GB) virtual space of each process. Kernel mode code (drivers, etc.) is limited to the upper 2GB of this space while user mode code is limited to the lower 2GB of this space.

Due to these limitations, many operating systems are unable to allow users/programs to take advantage of very large physical memory areas, such as those that exist on computer database servers. "Very large" in this context is relative to the virtual address space, and signifies, for example, memory areas greater than the "normally" allocated virtual memory areas of an operating system. Operating systems are not normally able to provide access to a physical memory larger than the virtual address space.

One solution includes reserving memory at boot time to be used as a physical cache of pages for specific applications. The disadvantages of reserving (preallocating) memory at boot time include: (i) the memory size is predefined and hard coded at boot time, and therefore not modifiable after boot time; (ii) such memory requires special operating system calls (I/O calls); and (iii) specialized drivers are needed to address the memory since allocation is not through the operating system and therefore does not use operating system addressing.

Thus, there is a need for improvement in the art with respect to large memory allocation in computer systems.

SUMMARY OF THE INVENTION

The present invention solves the problem of allocating and accessing very large memories without introducing the disadvantages of prior art solutions. In particular, the present invention provides a mechanism which enables either kernel code or user code to allocate and access a much larger memory space, thus taking advantage of the very large physical memories that exist on today's database servers.

In particular, the present invention provides a computer method and apparatus for allocating a very large memory area comprising the steps of:
  under a given operating system, creating a multiplicity of processes;
  aggregating the created processes to form a single working memory area; and
  accessing the working memory area relative to the created and aggregated processes using an access locator, such that the virtual address spaces of the processes are accessed as though they were a single working memory area.

In a preferred embodiment, the step of creating includes (i) allocating physical memory to each created process; and (ii) associating each process's virtual address space with physical memory. Further, the step of associating includes (a) generating a respective process identifier, or PID, for each created process, and (b) in an array, listing each PID. In turn, the step of accessing is by references to PID in the array. Each reference enables access of a respective portion of physical memory for a corresponding process, and hence enables the entire large working memory area to be accessed.

In accordance with another aspect of the present invention, the step of accessing includes using a predefined multi-bit address space addressed by the access locator. The access locator has an upper portion and a lower portion. The number of bits in the lower portion is limited by the size of the virtual address space of the operating system. The step of accessing thus uses the lower portion of the access locator to indicate location, for example byte location, within a certain created process's virtual address space, and the upper portion of the access locator to indicate the certain process amongst the other created processes which form the working memory.

In a preferred embodiment, the access locator comprises at least 33 bits. The lower 30 bits indicate location within a process's virtual address space, while the upper 3 bits or more indicate the certain process amongst the other created processes forming the working memory.

In another preferred embodiment, the step of creating includes (i) allocating physical memory to each created process; and (ii) associating each process's virtual memory with physical memory. Further, the step of associating includes (a) generating a page array for each process, mapping virtual pages to physical pages, and (b) locking the formed working memory area such that the association (as represented by the page array) so formed remains static. In turn, the step of accessing is by references to page numbers in the page map. Each reference enables access of a respective portion of physical memory for a corresponding process, and hence enables the working memory area to be accessed.

BRIEF DESCRIPTION OF THE DRAWINGS

The foregoing and other objects, features and advantages of the invention will be apparent from the following more particular description of preferred embodiments and the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
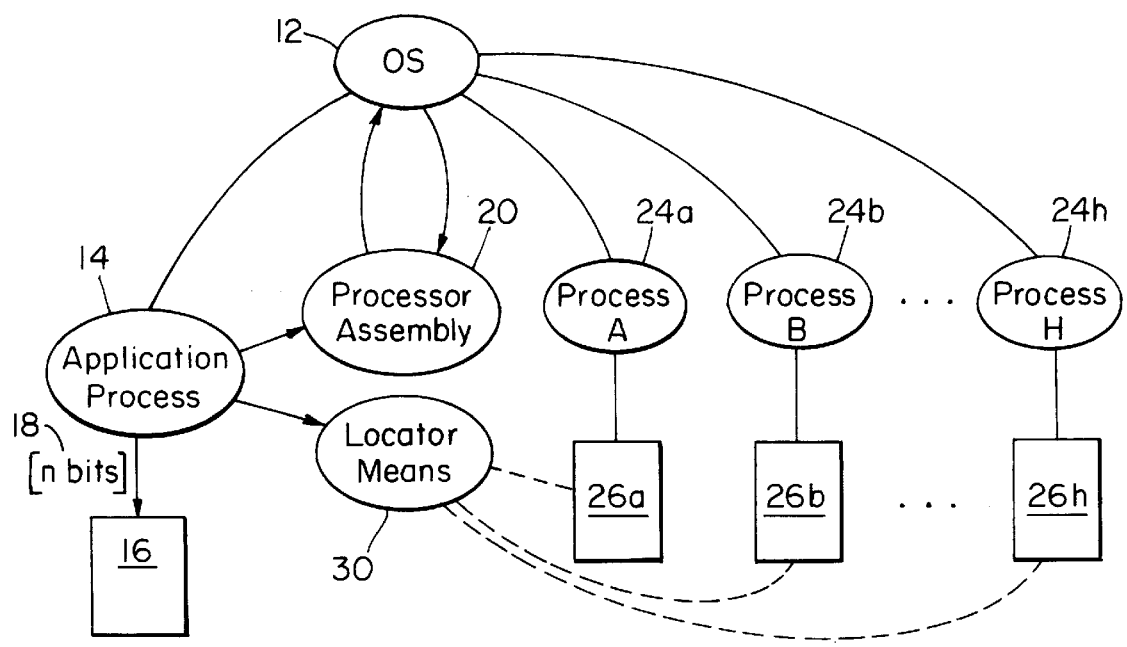
FIG. 1 is a block diagram of a computer system employing the present invention.

Illustrated in FIG. 1 is a computer system employing the present invention. In general the computer system is formed of a digital processor and an accompanying operating system 12. The operating system 12 is responsive to work entities known as "jobs" or "processes" 14. In general, a process 14 is an instance of a running program, containing code, threads of control, address space and a register set.

For example, when a user at a computer terminal enters the name of a program, the operating system 12 creates a new process 14 and runs the program within the process 14. However, creation of processes is not limited to user actions. A running program, executing within one process 14, may request that a second process be started so that another program (or another copy of the same program) can run simultaneously. Requests for a new process are made to the operating system 12. Each process thus created is assigned a unique process identifier ("PID") by the operating system 12. The operating system 12 maintains assigned PIDs in a process table until the process is terminated. After creating the requested process, the operating system 12 returns the PID to the requesting process 14.

Further, each process 14 has associated with it a "virtual address space" 16. This is the maximum capacity a process 14 can directly address, although more or less physical memory may exist.

As illustrated in FIG. 1, the operating system 12 utilizes an n-bit virtual memory address 18. Thus each process 14 is able to address up to $2^n$ bytes of virtual memory 16. The $2^n$ byte virtual memory space 16 is further configured between kernel mode and user mode use. For example, the upper half of the $2^n$ bytes is used for kernel text, kernel code and kernel data, and the lower half of the $2^n$ bytes is configured for use by applications programs and the like. A single piece of code can allocate memory only within either the upper or lower half of the virtual address space 16.

Virtual addresses are typically mapped to physical addresses in blocks called "pages". In very large memory systems, the operating system (possibly with the help of a Memory Management Unit) may map one or more processes' entire virtual address spaces to physical memory.

In the present invention, a processor assembly 20 is coupled to the operating system 12 for allocation of memory in amounts greater than the usual $2^n$ bytes of virtual memory 16 per process 14. In response to a need for a large (e.g., greater than $2^n$ bytes) amount of working memory, the processor assembly 20 requests a multiplicity of processes 24 from the operating system 12. In particular, for each unit of desired memory, the processor assembly 20 creates a separate process 24a–24h. For example, if a total of eight gigabytes (GB) is desired, then in a system where units of 1 GB of contiguous virtual memory may be allocated to a process, the processor assembly 20 requests eight separate process 24a–24h, one for each gigabyte desired.

Each created process 24a–24h has a respective virtual memory space 26a–26h. However, in contrast to the prior art where processes are typically bound to code or threads of control, the allocated virtual memory spaces 26a–26h for the plurality of created processes 24a–24h (i) are not bound to any code or threads, and (ii) are used collectively in the computer system in accordance with the present invention. That is, the present invention aggregates the allocated virtual memory spaces 26 to effectively form a single working memory area having a size that is multiple times greater than the traditional virtual memory space of one process. Thus, the present invention provides very large memory allocation in a computer system.

Also, in order to access the formed working memory area (i.e., allocated large memory), the present invention includes/provides locator means 30. Locator means 30 enables requesting process 14 to access the formed working memory area by virtual or physical memory address, as illustrated in the following examples of the different embodiments of FIGS. 2 and 3. The following is by way of illustration, and not a limitation, of the locator means 30 and hence the present invention.

Figure 2:
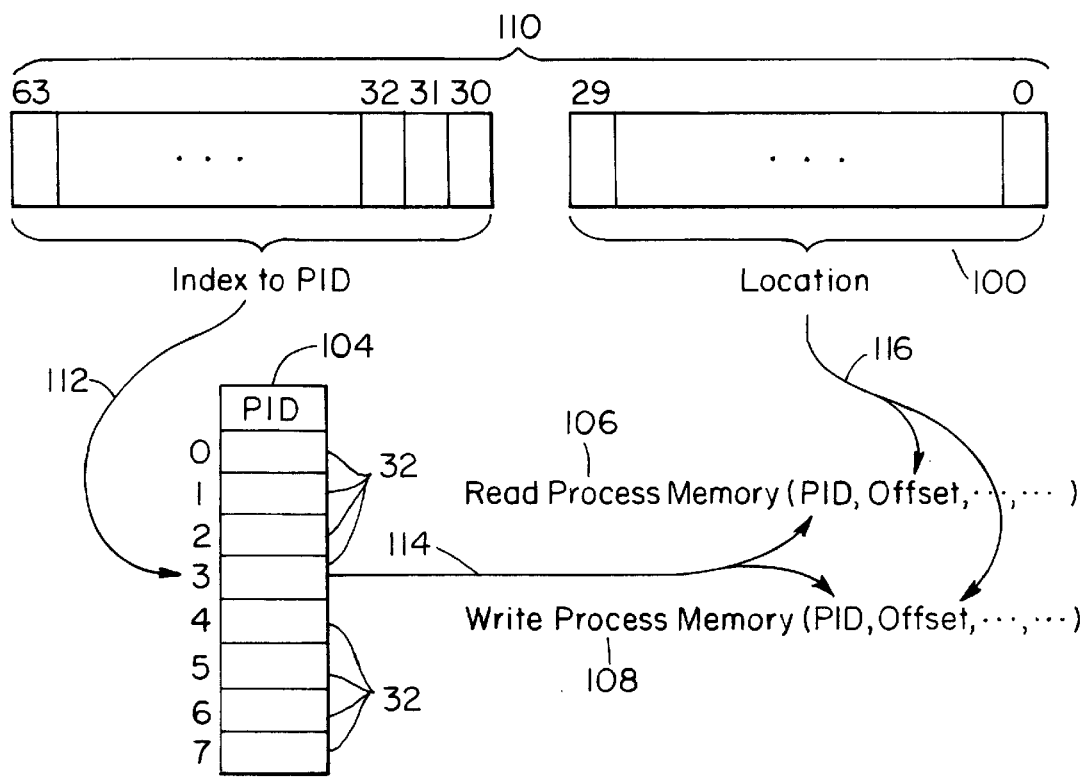
FIG. 2 is a block diagram depicting an access locator and a process identifier array in one embodiment of the invention.

FIG. 2 depicts a preferred embodiment having locator means 30 formed of an access locator 110 and a process identifier (PID) array 104. An access locator 110 is at least thirty-three bits wide, and comprises two portions: a lower, location or offset portion 100, comprising thirty bits; and an upper, PID index portion 102. As present invention processes 24 (FIG. 1) are created by the operating system 12 in response to requests from the processor assembly 20, the PIDs of the newly created processes 24 are returned to the processor assembly 20, which stores them in the PID array 104. To access (read or write) a specific location in the created large working memory area, the PID index portion of its address (i.e., PID index portion 102 of access locator 110) is used as an index 112 into the PID array 104, at which point a PID associated with the desired byte location is retrieved 114.

In Windows NT, two routines—though originally provided to assist in debugging—are available which allow read and write access to the virtual memory of various processes: ReadProcessMemory( ) 106 and WriteProcessMemory( ) 108. The retrieved PID 114 is used as one argument to these routines, while the offset portion 100 of the address/access locator 110 is copied directly, at 116 into another argument. (Other arguments to these routines are peripheral and are therefore not discussed.) Calling one of these routines 106, 108 thus provides read and write access to the desired locations in the present invention's large working memory area.

Figure 3:
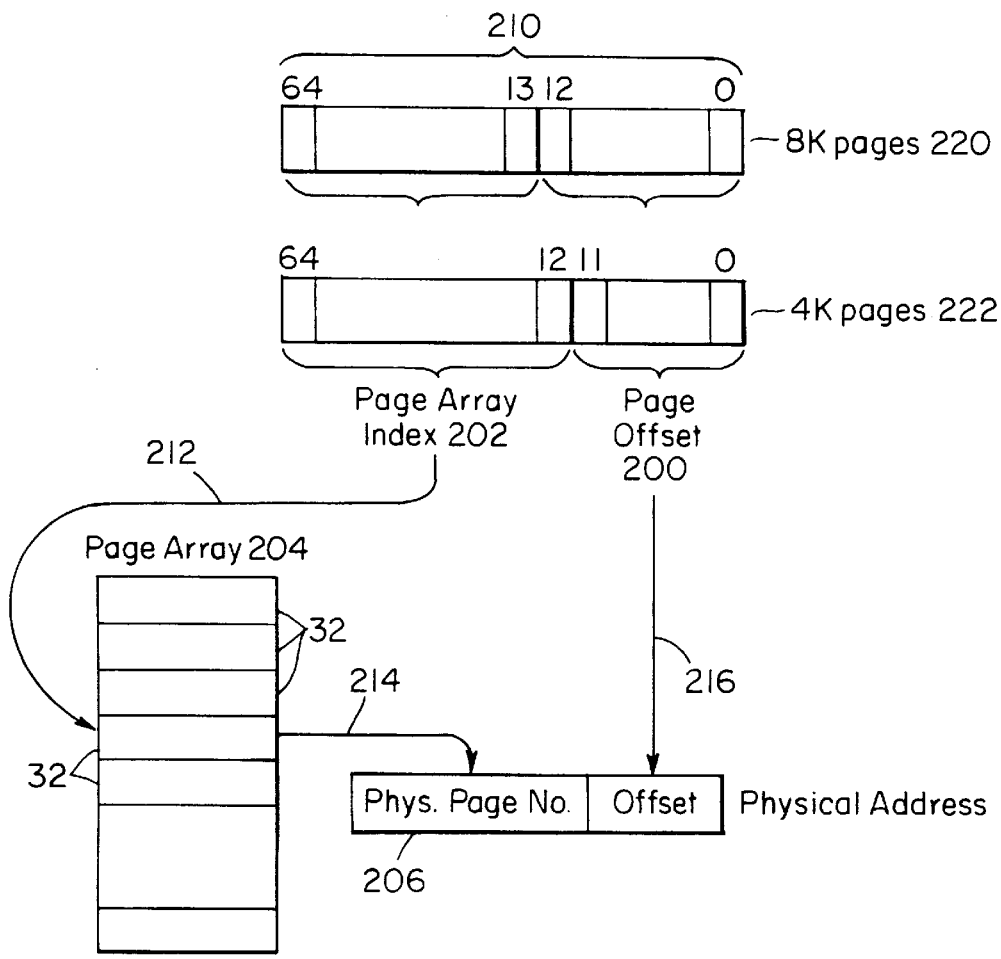
FIG. 3 is a block diagram depicting an access locator and a page array in another embodiment of the invention.

FIG. 3 depicts another embodiment of the invention in which locator means 30 (FIG. 1) employs a page array 204 rather than a PID array 104. In this embodiment, an access locator 210 comprises a lower, page location or offset portion 200, and an upper, page array index portion 202. Although many combinations are obviously possible, two different arrangements 220,222 are shown: first, where page size is 8 Kbytes 220 so that the page offset portion 200 of the access locator comprises thirteen bits ($2^{13}$=8K) and the page array index portion 202 comprises from 20 to 51 bits; and alternately, where page size is 4 Kbytes 222 so that the page offset portion 200 of the access locator comprises twelve bits ($2^{12}$=4K) and the page array index portion 202 comprises from 21 to 52 bits.

When more physical memory is required, the processor assembly 20 requests a new process 24. This can be accomplished, for example, by having a small amount of code exist in each new process 24 when it is first created which allocates the physical memory and generates a page array 204. The page array 204 has an entry for every page in the virtual space. The process 24 thus generates its own mapping between virtual and physical memory before deleting its code and becoming a true codeless, container process 24 of the present invention. It will be recognized by those skilled in the art that there are other ways to generate such a page array 204. After creating the page array 204 and mapping the pages, the pages are locked so that the array 204 becomes static and is guaranteed to be accurate at all times. Finally, the page number or list of page numbers is returned to the processor assembly 20.

Unlike the embodiment of FIG. 2, since a physical address is obtained, this embodiment requires access to physical memory. For example, Digital Equipment Corporation's Alpha processors provide a "KSEG" mode whereby physical memory may be directly accessed. An address in KSEG mode utilizes specific leading bits to indicate that the remaining lower bits are a physical memory address as opposed to a virtual address. Many processors now allow some kind of direct physical memory access, but where none exists, another, less efficient, means of accessing physical memory pages may be done such as mapping the physical page into a "windowing area" in the kernel virtual space.

In a preferred embodiment, the operating system is Windows NT by Microsoft. Windows NT uses a 32-bit, or 4 GB ($2^{32}$) virtual memory address space. Two gigabytes of the 4 GB virtual memory are used for kernel text, kernel code and kernel data (i.e., kernel mode). The remaining two gigabytes are for user applications (i.e., user mode). However, the bottom page of the virtual address space is not usable, i.e., it is reserved by the operating system. Furthermore, Windows NT reserves the top 64 Kbytes for operating system purposes. Thus the actual usable amount in each of the kernel mode and user mode is somewhat less than 2 GB.

Therefore, for simplicity in the preferred embodiment, for each created process 24 in the present invention, one gigabyte of virtual memory in the middle of the 2 gigabyte user virtual address space is utilized.

Figure 4:
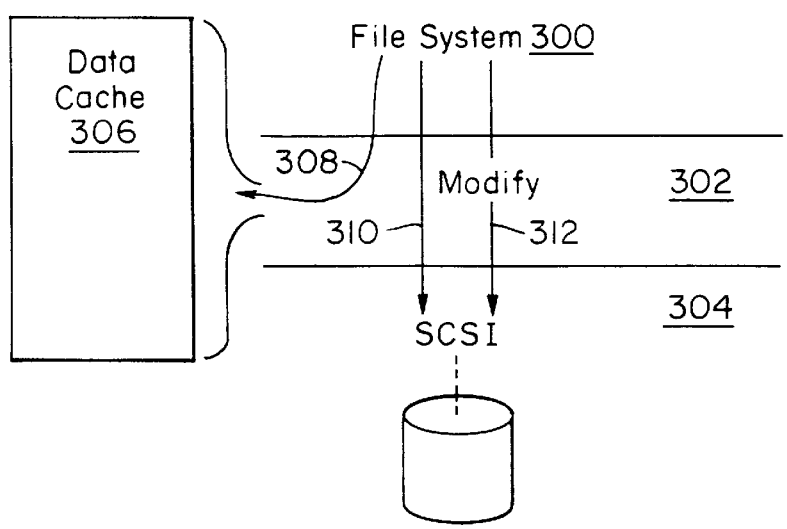
FIG. 4 is a schematic illustration of a disk caching system embodying the present invention.

One use of the present invention is in a disk caching device. For example, as shown in FIG. 4, the present invention is built into a "shim driver" 302, that is, a driver which is logically placed between the file system 300 and, for example, a SCSI (Small Computer System Interface) driver 304, neither of which need to have any direct knowledge of the existence of the shim driver 302. The large working memory area is used as a data cache 306. As the file system 300, which may even have its own level of disk caching, but within the kernel virtual space, sends a request to the SCSI driver 304 for data, the request may be intercepted 308, modified 312, or passed on 310 by the shim driver 302. If the request can be satisfied in a very large working memory area 306 cache, the request need not be passed on to the SCSI driver 304. Otherwise, the shim driver 302 can pass the request on to the SCSI driver 304 and caches the data returned by the SCSI driver 304 in the data cache 306 while also passing the data back to the file system 300.

SOFTWARE SUPPORT

Figure 5:
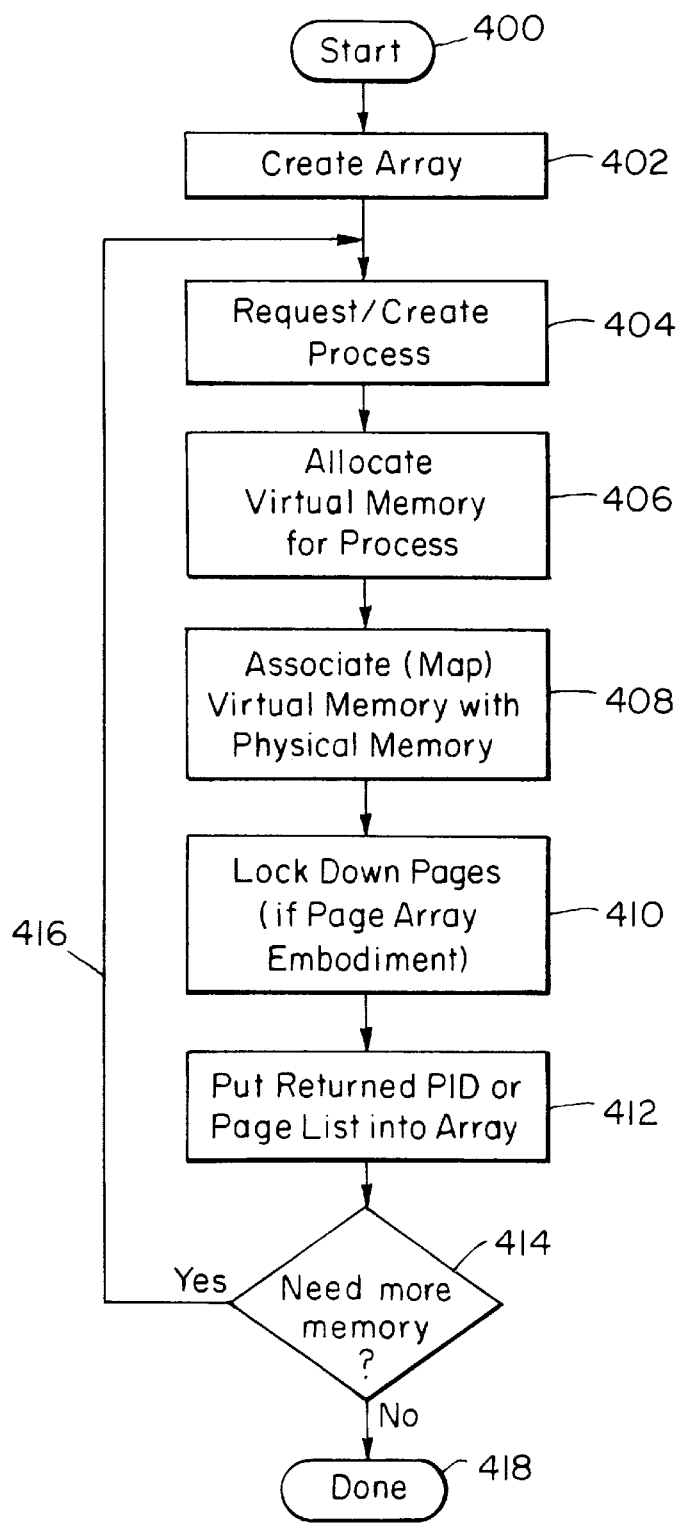
FIG. 5 is a flow diagram of the invention in the computer system of FIG. 1.

FIG. 5 presents a flow diagram illustrating the processor assembly 20 steps involved in forming the large working memory area. The procedure begins 400 when control is passed to the invention. First an array as shown in FIG. 2 (ref. no. 104) or FIG. 3 (ref. no. 204) for holding process identifiers (PIDs) or page numbers respectively is created 402. Then for each memory unit needed, steps 404, 406, 408, 410 and 412 are repeated.

In step 404, as discussed regarding FIG. 1, the processor assembly 20 requests that the operating system create a process. The operating system does so and returns a PID, or alternatively, a page list is returned from the operating system or from the newly created process.

Next, the virtual address space of each new process is allocated 406 and associated (mapped) with physical memory 408. In the embodiment in which page numbers are to be held in the array (FIG. 3), the pages are locked down 410 so that the mapping or association will not change. Then the PID or the page list is entered into the array 412. If more memory is needed 414, these steps are repeated 416. If not, the procedure is complete 418 until more memory is requested.

EQUIVALENTS

While the invention has been particularly shown and described with reference to a preferred embodiment thereof, it will be understood by those skilled in the art that various changes in form and details may be made therein without departing from the spirit and scope of the invention as defined by the appended claims.

For example, the foregoing discussions of the present invention in Windows NT and Digital Equipment Corporation Alpha environments are for purposes of illustration and not limitation. The present invention may be implemented in a number of operating systems, and is usable in kernel mode or user mode.

Further, it is understood by the forgoing description and figures that any number of processes may be spawned and utilized by the present invention processor assembly 20 to form a very large working memory area, in response to a request for allocating large memory. Also, each such generated process is effectively a container process (codeless and threadless) for collective use as a very large working memory as defined by the present invention.

In addition, it would be within the purview of one skilled in the art to allocate more or less than 1GB of user virtual address space per container process and to align this allocated memory anywhere within the available user virtual address space.

I claim:

1. Computer method for allocating a large memory comprising the steps of:

under a given operating system employing virtual addressing, creating a multiplicity of processes, each process associated with a virtual address space;

aggregating the created processes to form, from their respective virtual address spaces, a single working memory area which is accessible through an access locator, the access locator referencing the working memory area relative to the processes created and aggregated to form the working memory area; and, subsequently accessing the working memory area using the access locator.

2. A method as claimed in claim 1 wherein:

said step of creating includes generating a respective process identifier for each process created the step of aggregating includes (a) cross referencing in a table each process with the respective process identifier, and (b) enabling the access locator to indicate a desired process; and said step of subsequently accessing the working memory area is by (i) using the access locator indication of the desired process as a reference into the table, obtaining the process identifier from the table, and (ii) together with the obtained process identifier, referencing a desired virtual memory location of the desired process and hence accessing the working memory area.

3. A method as claimed in claim 2 wherein the step of creating includes allocating respective physical memory to each created process.

4. A method as claimed in claim 2 further comprising the step of forming the access locator using a predefined multi-bit address having an upper portion and a lower portion, number of bits in the lower portion being limited by size of the virtual address space of the operating system, said lower portion indicating location within the virtual address space of a certain created process, and said upper portion indicating the certain process amongst the other created processes forming the working memory area.

5. A method as claimed in claim 4 wherein the step of forming the access locator includes using a first set of 32 bits and a second set of 32 bits, by employing 30 bits of the first set to indicate location within a certain process, and a following 2 bits of the first set combined with one or more bits from the second set to indicate the certain process.

6. A method as claimed in claim 1 wherein the step of creating includes:

allocating physical memory to each created process, such that each process is associated with physical memory; and locking the formed working memory area such that the association formed between each process and physical memory remains static.

7. A method as claimed in claim 6 wherein:

the step of allocating physical memory generates a list of physical memory page numbers;

the step of aggregating includes (i) recording the physical memory page numbers in an array having a plurality of entries, one entry for each page number;

and (ii) enabling the access locator to indicate a desired entry into the array; and the step of subsequently accessing the working memory area includes using the access locator indication of desired entry into the array, obtaining the respective physical memory page number from the array, and together with the obtained physical memory page number, referencing a page offset.

8. A method as claimed in claim 7 further comprising the step of forming the access locator using a predefined multi-bit address having an upper portion and a lower portion, said lower portion indicating a page offset within a set of physical memory pages, and the upper portion indicating that the lower portion is a physical memory address.

9. Computer apparatus for allocating large memory comprising:

a computer with a large physical memory;

an operating system resident and running in said computer, said operating system being able to create multiple processes, each process having an allocated virtual memory space;

a processor assembly running under said operating system and communicating with said operating system, in response to a need for an amount of working memory, the processor assembly requesting from the operating system a plurality of processes, and aggregating said plurality of processes subsequently created by the operating system in response to the request, to form a single working memory area from the created processes' respective virtual address spaces; and locator means coupled to the processor assembly and enabling subsequent access to the formed working memory area of the created processes, in a manner such that the plurality of created processes operates as a single collective working memory area.

10. Computer apparatus as claimed in claim 9 wherein the processor assembly further receives from the operating system a respective process identifier for each process created; and the locator means further includes:

a table in which the processor assembly records each process identifier with respect to its respective process, and an access locator referencing into the table to obtain the process identifier for a desired process and referencing a desired virtual memory location of the desired process such that the access locator enables access to the working memory area.

11. Computer apparatus as claimed in claim 10 wherein the processor assembly creates processes by allocating and associating respective physical memory to each process such that the working memory area stays resident within physical memory.

12. Computer apparatus as claimed in claim 9 wherein for each created process the operating system allocates physical memory and associates the process with physical memory in a manner such that the association between physical memory and the created process and hence physical memory addresses of the formed working memory area remains static.

13. Computer apparatus as claimed in claim 12 wherein:

for each created process, the operating system associates the process with physical memory by generating a list of physical memory page numbers;

in response to the operating system, the processor assembly records the physical memory page numbers in an array having a plurality of entries, one entry for each page number; and the locator means enables subsequent access to the working memory area by employing an indication of desired entry into the array to obtain the respective physical memory page number from the array, said obtained physical memory page number, together with an indication of a desired page offset, enabling access to the working memory area.

14. Computer apparatus as claimed in claim 12 wherein the locator means includes an access locator comprising an upper portion and a lower portion, said lower portion indicating a page offset within a physical memory page, and the upper portion indicating that the lower portion is a physical memory address.

15. Computer apparatus for allocating large memory comprising:

under a given operating system employing virtual addressing, means for creating a multiplicity of processes, each process associated with a virtual address space;

means for aggregating the created processes to form, from their respective virtual address spaces, a single working memory area which is accessible through an access locator, the access locator referencing the working memory area relative to the processes created and aggregated to form the working memory area; and means for subsequently accessing the working memory area using the access locator.

16. The computer apparatus of claim 15 wherein:

said means for creating comprises means for generating a respective process identifier for each process created;

said means for aggregating comprises (a) means for cross referencing in a table each process with the respective process identifier, and (b) means for enabling the access locator to indicate a desired process; and said means for subsequently accessing the working memory area further comprises:

means for using the access locator indication of the desired process as a reference into the table, and for obtaining the process identifier from the table, and means for referencing, with the obtained process identifier, a desired virtual memory location of the desired process and hence accessing the working memory area.

17. The computer apparatus of claim 16 wherein said means for creating a multiplicity of processes comprises means for allocating respective physical memory to each created process.

18. The computer apparatus of claim 16 further comprising means for forming the access locator means using a predefined multi-bit address having an upper portion and a lower portion, number of bits in the lower portion being limited by size of the virtual address space of the operating system, said lower portion indicating location within the virtual address space of a certain created process, and said upper portion indicating the certain process amongst the other created processes forming the working memory area.

19. The computer apparatus of claim 15 wherein said means for creating a multiplicity of processes further comprises:
   means for allocating physical memory to each created process, such that each process is associated with physical memory; and
   means for locking the formed working memory area such that the association formed between each process and physical memory remains static.

20. The computer apparatus of claim 19 wherein:
said means for allocating physical memory further comprises means for generating a list of physical memory page numbers;
said means for aggregating further comprises
   means for recording the physical memory page numbers, and
   means for enabling the access locator to indicate a desired physical page; and
said means for subsequently accessing the working memory area further comprises
   means for using the access locator indication of desired recorded physical page to obtain the respective physical memory page number, and
   means for referencing a page offset using the obtained physical memory page number.

* * * * *